P. RICHERT.
TAXIMETER OR FARE INDICATOR FOR HIRED VEHICLES.
APPLICATION FILED SEPT. 7, 1909.

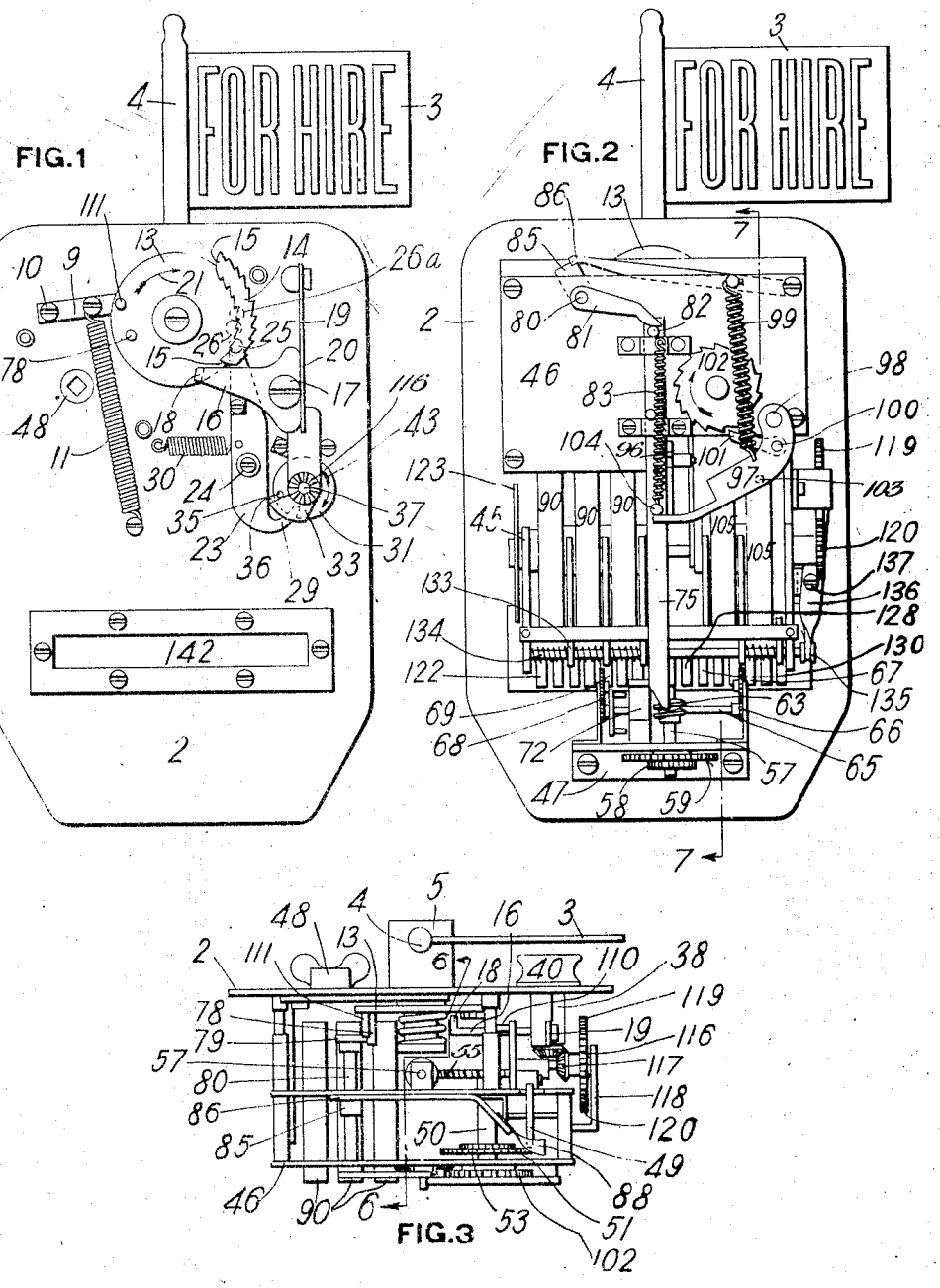
P. RICHERT.
TAXIMETER OR FARE INDICATOR FOR HIRED VEHICLES.
APPLICATION FILED SEPT. 7, 1909.
986,758.
Patented Mar. 14, 1911.
4 SHEETS—SHEET 1.

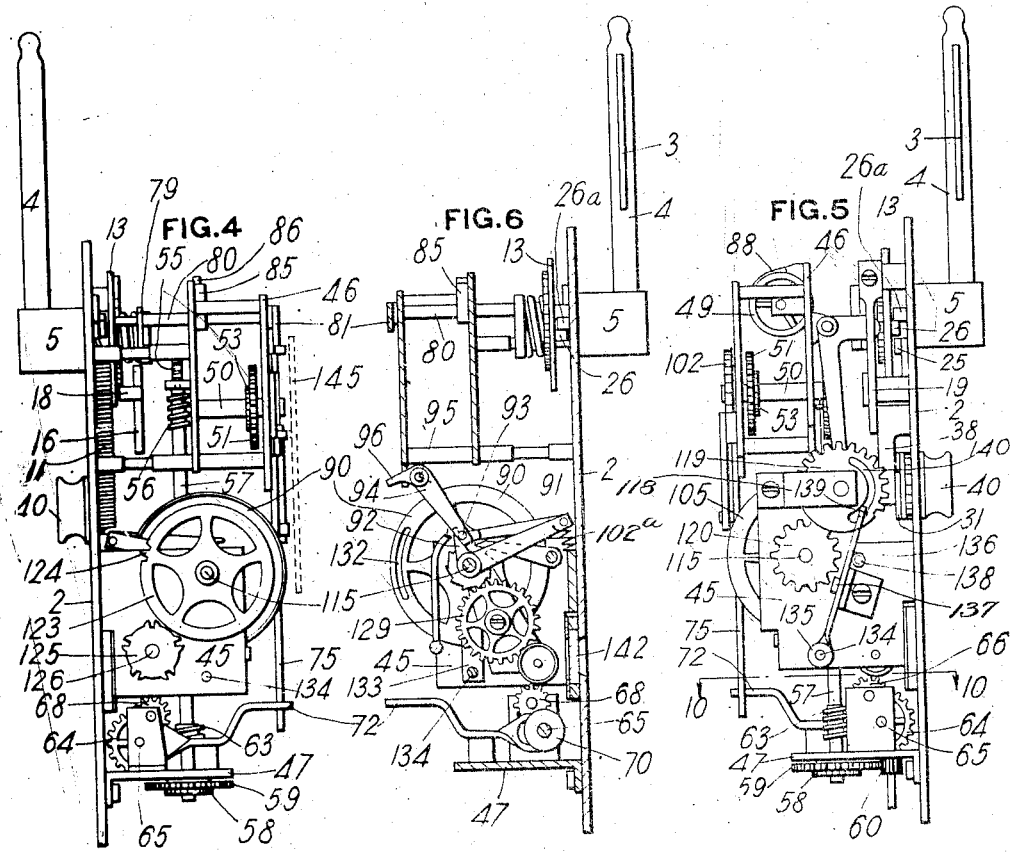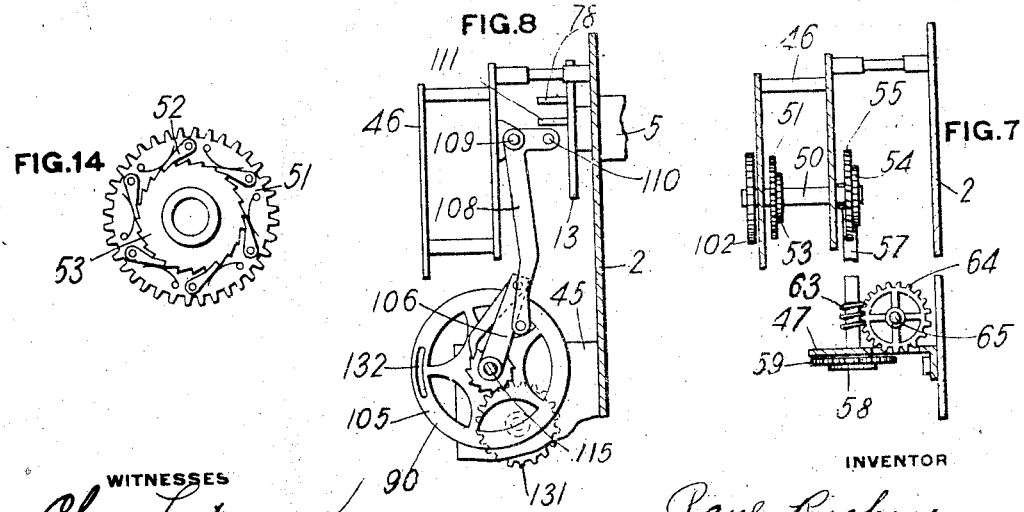

986,758.

Patented Mar. 14, 1911.
4 SHEETS—SHEET 4.

WITNESSES
Chas. Osterman
Jno. P. Wadlem

INVENTOR
Paul Richert.
By Fred'k W. Winter.
Attorney

UNITED STATES PATENT OFFICE.

PAUL RICHERT, OF NEW YORK, N. Y.

TAXIMETER OR FARE-INDICATOR FOR HIRED VEHICLES.

986,758.  Specification of Letters Patent.  Patented Mar. 14, 1911.

Application filed September 7, 1909. Serial No. 516,505.

*To all whom it may concern:*

Be it known that I, PAUL RICHERT, a resident of New York, in the county of New York and State of New York, have invented a new and useful Improvement in Taximeters or Fare-Indicators for Hired Vehicles, of which the following is a specification.

This invention relates to taximeters or fare indicators for hired vehicles.

The object is to provide a taximeter which provides protection against fraudulent manipulations thereof by the driver and prevents him from cheating either the owner or the user of the vehicle.

The principal improvements over prior devices of the same kind are to simplify the apparatus as a whole, make it more reliable in operation and insure that the indicators or registers do not miss or overthrow; and to further safeguard the fraudulent manipulation by the driver.

The specific improvements comprised within this invention will be hereinafter particularly pointed out in the description and claims.

Figure 11:
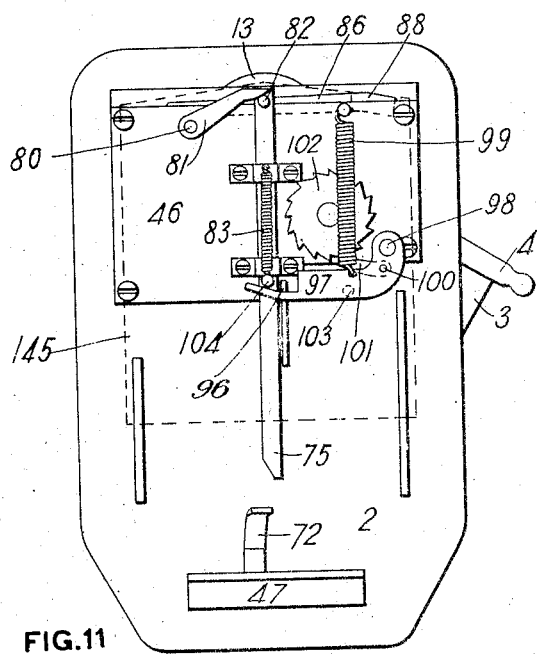
Figure 12:
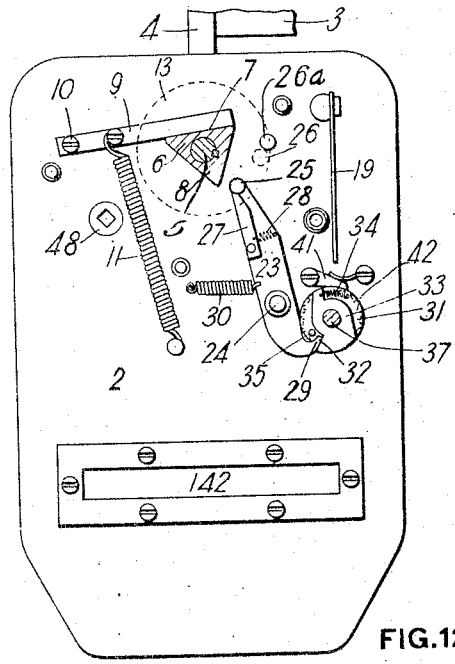
Figure 13:
Figure 9:
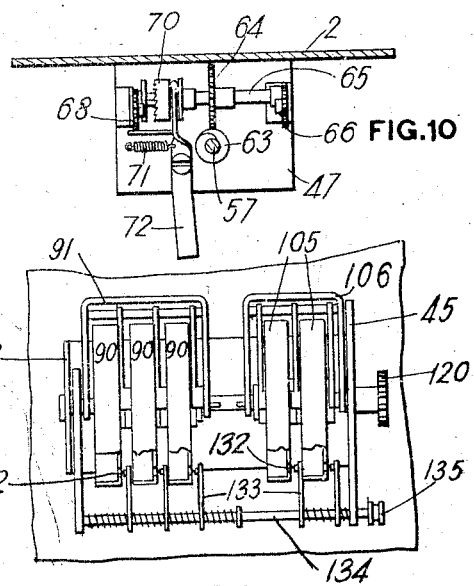
Figure 15:
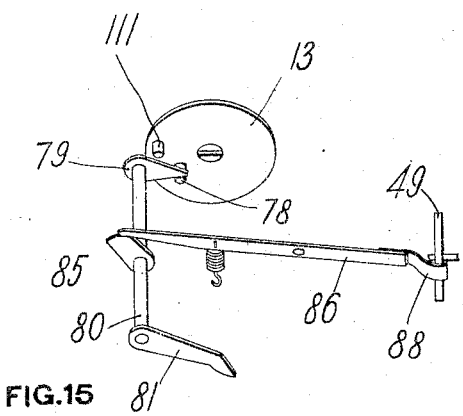
Figure 18:
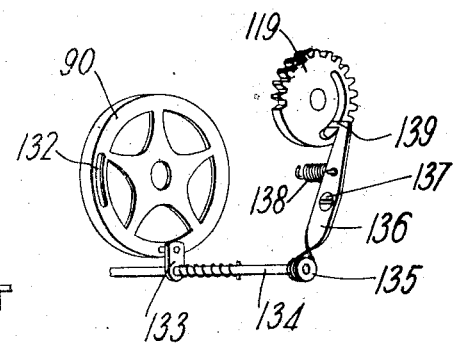
Figure 17:
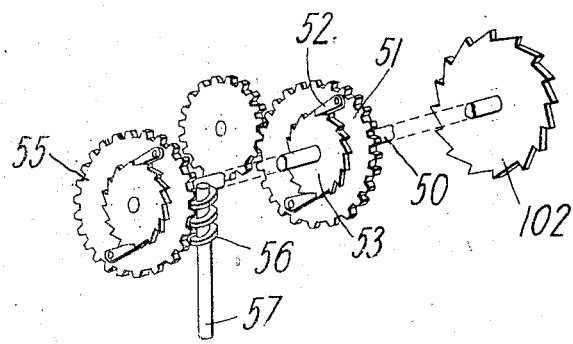
Figure 16:
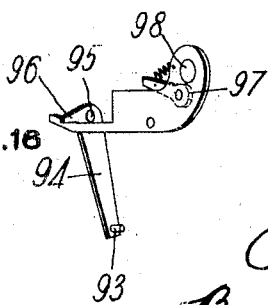

In the accompanying drawings, Figure 1 is an inside view of the back plate or wall of the taximeter casing with the clock, registers and indicators and most of the actuating mechanism removed; Fig. 2 is a front elevation of the mechanism with the casing and indicating plates removed; Fig. 3 is a top plan view of the same, the major portion of the clock mechanism being omitted; Fig. 4 is a side elevation of the same viewed from the left hand of Fig. 2; Fig. 5 is a similar view from the right hand of Fig. 2; Fig. 6 is a vertical section on the line 6—6, Fig. 3; Fig. 7 is a similar view of a portion of the mechanism taken on the line 7—7, Fig. 2; Fig. 8 is a side sectional view showing the connections for actuating the extra tariff indicator; Fig. 9 is a vertical section showing the means for locking the indicator wheels at zero; Fig. 10 is a horizontal section on the line 10—10, Fig. 5; Fig. 11 is a front view showing parts of the mechanism in a different position from Fig. 2; Fig. 12 is a vertical sectional view taken just in front of the back plate; Fig. 13 is an outside front view of the device; Fig. 14 is a detail view of one of the slip connections; Fig. 15 is a perspective view of the connections from the flag disk to the clock and to the slide for throwing the pay mileage register out of operation; Fig. 16 is a similar view showing the operative arrangement of the levers for operating the ordinary tariff registers; Fig. 17 is a similar view showing the trains of gearing connected to the main register operating arbor; and Fig. 18 is a similar view illustrating the operation of the mechanism for locking the indicator disks at zero.

The apparatus illustrated has five functions or registrations which are to be effected thereby, to-wit: —1— The total mileage traveled by the vehicle; 2— The number of miles traveled for which pay was or should have been received; 3— The number of trips run, or initial fares received; 4— The number of additional tariffs, usually ten cents, which were added to the initial fares in the use of the vehicle; and 5— The extra fares or tariffs. All of these registrations except the last are made entirely automatically and without any manipulation on the part of the driver or chauffeur and all being free from any manipulation by him.

The entire mechanism is inclosed in a suitable casing 1 having a removable back wall or plate 2 to which all of the mechanism is secured.

3 represents the usual signal or flag arranged to be lifted to indicate that the vehicle is for hire, or to be turned down to indicate that the vehicle is engaged. The shaft or staff 4 of the flag forms a lever for setting the taximeter into or out of operative condition, according as said flag is lifted or lowered. This flag shaft is secured to a spindle 5 extending through and rotatably mounted in the back plate 2. Secured or formed on said spindle immediately inside of the back plate is a triangular member 6 against whose two flat faces 7 and 8 a lever 9 fulcrumed at 10 is held by a strong spring 11, said spring pressed lever and flat faces on member 6 serving to yieldingly hold the spindle 5 either in position with the flag raised or in position with the flag depressed, so that if said spindle be rotated somewhat away from either of those positions the pressure of arm 9 against member 6 will return the spindle to the desired position, as will be readily understood. Also secured to the inner end of spindle 5 is a disk 13 provided on its inner face with a segment 14 provided with ratchet teeth both on its inner and outer faces, the ratchet teeth on the two faces sloping oppositely, as shown in Fig. 1. The segment is provided with inclined ends 15. An arm 16 is fulcrumed at 17 and provided on its end with a lug or finger 18 adapted to coöperate with the ratchet teeth on segment 14. A plate spring 19 bears against a broad flat surface 20 on the arm 16 and holds said arm in such position that the finger or lug 18 lies substantially centrally in the path of movement of segment 14 when spindle 5 is rotated. When spindle 5 is rotated, for instance, in the direction of the arrow 21 on Fig. 1, which occurs when the flag is pulled down, the inclined lower end of segment 15 engages finger or lug 18 and pushes the end of arm 16 down and the segment passes over the end of said arm and the finger or lug 18 clicks over the ratchet teeth on the outer face of segment 14. These teeth are so inclined that they permit the disk 13 to be rotated in the direction of arrow 21 but do not permit the reverse movement. When, however, the upper end of said segment passes beyond the finger or lug 18 the spring 19 moves the arm 16 to normal position, so that in the reverse movement of the disk 13 the inclined upper end 15 of segment 14 engages the finger 18 and pushes the end of lever 16 up, so that the finger 18 now coöperates with the ratchet teeth on the inner face of segment 14, which ratchet teeth are oppositely inclined to those on the outer face of said segment, and permit the disk to be rotated in a direction reverse to arrow 21, but not in the opposite direction. Consequently, when the driver or chauffeur starts to move the flag down he is compelled to move it down completely, and, vice versa, when he starts to move it up he must also move it up completely, the ratchet segment 14 with arm 16 preventing any reverse movement in either direction until the full movement has been effected. This makes difficult the manipulation of the meter by operating the signal or flag.

When the flag is in raised position, or as shown in Fig. 1 it is locked so that it cannot be pulled down by an unauthorized person. This locking is effected as follows: A lever 23 is fulcrumed to the back plate at 24 and at its upper end is provided with a projection or lug 25 arranged to be brought into and out of the path of movement of a projection or stud 26 on the rear face of disk 13. Pivoted to said lever 23 is a trigger 27 normally held by spring 28 against the lug 25 on the lever. The lower end of lever 23 is provided with a toe 29 which is held by spring 30 against the face of the locking disk 31. The latter is provided on its periphery with a notch 32 into which the toe 29 may enter when said disk is rotated to the proper position. A pivotally mounted plate 33 is normally held by spring 34 against stop 35 to cover the notch 32. One edge 36 of plate 33 projects radially beyond the periphery of disk 31. Disk 31 is secured to spindle 37 extending through and rotatably mounted in the back plate 2 and out-bearing member 38. At its outer end this spindle is provided with a knob 40 for rotating the locking disk. A spring pressed pawl 41 coöperates with ratchet teeth 42 on the disk 31 and permits the said disk to rotate only in the direction of the arrow 43 on Fig. 1. When the flag is up these parts are in the position shown in Fig. 1 with the projection 25 on lever 23 lying in the path of projection 26 on disk 13, and the toe 29 of lever 23 bearing against the periphery of disk 31 and of plate 33. In this position the flag 4 cannot be pulled down so that in case the driver should leave the vehicle a mischievous individual could not set the meter to operative position. In order to permit the flag to be lowered the driver or chauffeur turns the knob 40 so as to rotate disk 31 in the direction of the arrow 43. When said disk has made nearly a complete revolution the toe 29 of lever 23 abuts against the projecting edge 36 of plate 33 so that in the further rotation of the disk 31 the plate 33 is pushed back against the tension of spring 34 thus uncovering the notch 32. As soon as the latter comes opposite the toe 29 of lever 23 the latter snaps into the same due to the tension of spring 30, and moves the upper end of lever 23 inwardly or toward the center of disk 13 and out the path of the shoulder or projection 26 on said disk. The flag can now be lowered. In lowering the same the projection or shoulder 26 on disk 13 moves the trigger 27 idly against the action of spring 28, and as soon as it has passed said trigger the latter is moved by spring 28 back against the projection 25 on lever 23. When the flag is moved to raised position the projection 26 on disk 13 contacts with trigger 27 but as the latter is now held by projection 25 against movement, the rotation of disk 13 pushes the upper end of lever 23 outwardly or away from the center of disk 13. This movement withdraws the toe 29 from notch 32 in locking disk 31, and permits the spring 34 to move the plate 33 to cover said notch, so that the toe 29 is prevented from again entering said notch when the projection 26 on disk 13 passes beyond the upper end of lever 23. Consequently, the lever 23 is held with its upper end in position to intercept the movement of projection 26 on disk 13 and holds the flag locked against downward movement. When the flag is raised the projection 26 on disk 13 contacts with a projection 26' on the back plate 2, which prevents the flag being moved in that direction beyond an upright position.

It will thus be observed that in order to lower the flag it is first necessary to turn spindle 37 through a complete revolution, and since knob 40 is small and practically concealed a mischievous person is not likely to discover how this can be done. The small size of the knob requires the chauffeur to grasp the same twice before he can give a complete revolution to the spindle and this serves as a check to prevent him from manipulating the register by repeated unlockings of the flag and movements of the same up and down. The registering mechanism counts up to 10,000 so that in order to cheat the meter the driver must manipulate the flag slightly less than 10,000 times before getting the register back to a position where his manipulations cannot be discovered. As it requires two separate graspings of the knob 40 to unlock the flag, and also requires the movement of the flag down and up again, in order to perform a single registration, it is at once obvious that the time required to go through this performance close to 10,000 times is such that the driver could not possibly find time during the day to do so, and consequently is deterred from attempting to manipulate the meter.

Secured to the back plate 2 is a frame or housing 45 containing registering and indicating disks, which are self-contained in said frame or housing and can be removed bodily with the removal of the frame or housing from the back plate. Also removably secured to the back plate 2 is a frame or housing 46 containing the clock mechanism for operating the registers and indicators when the vehicle is standing still. Also removably secured to the lower end of the back plate 1 is a bracket or frame 47 on which is mounted the mechanism for operating the indicators and registers from the wheels of the vehicle. All of these several frames or housings with the mechanisms thereon contained can be removed bodily from the back plate for purposes of inspection or repair, thus very greatly simplifying the apparatus as a whole.

The clock mechanism may be of any suitable character and in the drawings the bulk of this mechanism has not been indicated. The winding stem for the clock mechanism enters a socket in spindle 48 which extends through the back plate and is provided on its outer end with a suitable key or the like for winding the clock. This is the only part of the clock mechanism accessible from the outside of the casing. The drawings show merely the balance wheel 49 of the clock mechanism and the meter operating arbor or shaft 50. This shaft 50 has loosely mounted thereon a wheel 51 which is the last wheel of the clock train. Said wheel is provided with one or more pawls 52 engaging ratchet disk 53 secured to arbor 50. When wheel 51 is rotated more rapidly than arbor 50 the pawl engages ratchet wheel 53 to drive the same, but when arbor 50 is driven at a higher rate of speed than 51 the pawl merely clicks idly over ratchet wheel 53. Secured to arbor 50 is another ratchet wheel 54 similar to ratchet wheel 53, coöperating with a pawl or pawls on a worm wheel 55 loosely mounted on the arbor and which is in mesh with a worm 56 on the upper end of shaft 57 which is rotatably mounted in the bracket 47 and on its lower end has secured thereto a ratchet wheel 58 which is connected by means similar to those shown in Fig. 14 to a gear wheel 59, the latter being in mesh with a pinion 60 is driven from the vehicle wheel by a flexible shaft or other suitable transmitting mechanism as is usual. When the vehicle is running the arbor 50 is rotated from the shaft 57 through gear 55, the ratchet mechanism 53 between arbor 50 and the clock gear 51 providing the necessary slip to permit this. On the contrary when the vehicle is standing still arbor 50 is driven by the clock mechanism through gear 51, the ratchet mechanism 54 slipping, as will be readily be understood.

Shaft 57 near its lower end is provided with a worm 63 meshing with worm wheel 64 in the horizontal shaft 65. From this shaft a train 66 of gearing leads to register 67. The train of gearing to this register is always connected, so that register 67 registers the total mileage that the vehicle travels and this irrespective of whether a passenger has been carried or not. From shaft 65 another train of gearing 68 leads to a register 69 for registering the number of miles the vehicle travels when engaged, or what may be termed "Pay miles." This register, however, is not actuated except when the vehicle is occupied, and consequently the gear train for driving this register is disconnected whenever the flag is up. To this end on shaft 65 is a clutch 70 connected in the gear train 68. The clutch members are normally held in engagement by means of a spring 71 acting on clutch lever 72. The end of the clutch lever is adapted to be engaged by the inclined lower end of a vertical slide bar 75, which when the flag is up, is in its depressed position, as shown in Fig. 2, as will be hereinafter described, and pushes against the clutch lever to hold the clutch out of engagement. Consequently when the flag is up the register 69 is not actuated, but whenever the flag is lowered slide bar moves upwardly, (shown in Fig. 11,) to free the clutch lever and permit spring 71 to engage the clutch members so that register 68 is driven from the vehicle wheel.

The up and down movement of slide bar 75 is effected by the following mechanism: The disk 13 on the flag spindle 5 is provided with a pin or projection 78 arranged to engage an arm 79 on a rock shaft 80 mounted in the clock frame 46. The forward end of rock shaft 80 is provided with an arm 81 engaging a stud 82 on upper end of the slide bar 75. When the flag is raised the projection 78 thereon pushes the arm 79 downwardly, thus rocking shaft 80 and through arm 81 pushing slide bar 75 downwardly. The projection 78 does not pass the arm 79 and consequently the slide bar 75 is held depressed as long as the flag is down. A spring 83 is arranged to pull the slide bar 75 up as soon as released. The release is effected by turning the flag down which carries the projection 78 away from arm 79. The rock shaft 80 is also provided with a cam 85 arranged to act against a lever 86 provided at its outer end with a spring 88 adapted to contact the balance wheel 49 on the clock mechanism and stop the clock whenever the flag is brought to raised position.

The ordinary tariff to be paid by the passenger is shown by an indicator 90 comprising three rotatable wheels or drums having figures on their peripheries. These may be of a well known type of registering wheels actuated by ratchet and pawl from a rocking frame 91 pivoted on the indicator shaft as is usual. This rocking frame is provided with a projection 92 arranged to be engaged by a pin 93 on one end of bell crank lever 94 fulcrumed at 95 on the clock frame 46. The other end 96 of said lever lies in the path of movement of lever 97 fulcrumed at 98 to the clock frame and normally pulled upwardly by a strong spring 99. Lever 97 has pivoted thereon at 100 an arm 101 coöperating with a toothed cam disk 102 on the end of the clock arbor 50. The arm 101 abuts against a projection 103 on lever 97 and is prevented thereby from swinging away from the cam disk.

The cam disk 102 is driven in the direction of the arrow shown thereon in Fig. 2. The cam teeth of said disk in the rotation of the disk push the arm 101 downwardly, and since the latter hits against stop 103 this also pushes lever 97 downwardly, permitting the bell crank lever 94 to swing to the position shown in Fig. 6. As soon as the disk 102 is rotated so far that the arm 101 slides over the end of one of the cam teeth thereon, the spring 99 pulls the lever 97 suddenly upwardly, and as said lever engages the arm 96 of the bell crank lever 94 it swings the lower end of said lever outwardly against the projection 92 on rocking frame 91 and rocks said frame to move the indicator 90 one step forward. A spring 102ᵃ is arranged to bring the rocking frame back to its normal position. Since the disk 102 is driven either from the clock or from the vehicle wheel it is apparent that the indicator 90 is actuated either from the clock or the vehicle. The train of mechanism is so arranged that this actuation takes place at certain definite periods of time or distance traveled.

When the flag is up the clock is stopped as heretofore described and consequently disk 102 can be driven from the clock only when the flag is down. When the flag is up the disk 102 nevertheless is driven from the vertical shaft 57, and to prevent the indicator from being actuated when the vehicle is running with the flag up the following provision is made:—Slide bar 75 is provided with a pin 104 arranged to engage the lever 97, so that when said slide bar 75 is pushed downwardly by the raising of the flag, it pushes the lever 97 down so far as to disengage arm 101 from the cam disk 102, as shown in Fig. 2, so that if the vehicle is running when the flag is up disk 102 merely rotates idly and without affecting the indicator 90.

The extra fares or tariffs are displayed on an indicator 105 consisting of two wheels or drums having suitable figures on their peripheries. These also may be of a well known type and are rotated by ratchet and pawl mechanism from a rocking frame 106. This rocking frame is actuated by being engaged by the lower end of the vertical arm of bell crank lever 108 pivotally mounted at 109 on the clock frame 46 and having its horizontal arm provided with a projection 110 arranged to be engaged by a projection 111 on the disk 13 of the flag spindle. This operation is effected by hand by the driver when the flag is down. When the flag is down the projection 111 on disk 13 is not quite in contact with the projection 110 on bell crank lever 108. The disk and flag are held in this position by the spring 11 acting on arm 9 which engages a flat face 8 on the spindle member 6. To indicate the extra fares or tariffs the driver moves the flag downwardly somewhat farther than indicated in Fig. 11 so as to bring the projection 111 against the bell crank lever and actuate the indicator. He pushes the flag down this extra distance as many times as necessary to indicate the extra or additional fare or tariff. As soon as he releases pressure on the flag the spring 11 through arm 9 acting on the flat face 8 raises the flag slightly, or to its lower normal position. These extra fares or tariffs are only charged up at the end of the service.

The indicators 90 and 105 are returned to zero position by the rotation of shaft 115 upon which the indicator wheels are sleeved, in the usual way of returning indicators or registers to zero. As there is no novelty in this feature and as various connections for effecting this purpose are well known it is not described or illustrated. The shaft 115 is rotated by the following means: The spindle 37 of the flag unlocking means is provided with a bevel pinion 116 which meshes with a similar pinion 117 on a short spindle mounted in the end of the register housing 45 and an out-bearing 118. This spindle carries a gear 119 provided with teeth on a portion of its periphery only and meshing with a similar gear 120 on the end of shaft 115. When the flag is unlocked the gearing described rotates shaft 115 and through the same returns the indicators 90 and 105 to zero. The return to zero is effected before the complete rotation of the flag locking disk 31, and for the further rotation of said disk to complete the full rotation and permit the unlocking of the flag, the blank portion of wheel 119 is provided. The act of returning the indicators to zero also actuates the trip or initial fare register shown at 122. This is effected by providing on end of shaft 115 a wheel 123 provided with a tooth 124 adapted to engage a notched or star wheel 125 on a short spindle 126 which is geared to register 122. Consequently each time the flag is unlocked the indicators 90 and 105 are returned to zero and the register 122 is actuated to register an additional initial fare or trip. The rotation of knob 40 therefore performs three functions, first, to unlock the flag; second, to return the indicators to zero; and third, to register the initial fare or trip.

In returning to zero the units wheel of register 90 is returned to the unit next below the minimum fare. For instance, if the minimum fare is fifty cents, in returning the register to zero the register 90 is brought back to forty, and when the flag is pulled down when the passenger is taken on the movement of the slide bar 75 upwardly permits the lever 97 to actuate lever 94 to actuate the register 90 and display fifty on the indicator, which is the minimum fare. The number of tariff units added to this minimum fare and indicated on indicator 90 are counted on register 128 said register being driven from units wheel of register 90 by a train of gearing including a gear wheel 129 between the units wheels of the indicator and the units wheel of the register. Similarly the extra tariffs or fares displayed by indicator 105 are counted on register 130, similarly driven by toothed gearing 131 from the units wheel of indicator 105. In this way a positive driving of the registers from the indicators is obtained, which is much more reliable, less liable to miss or overthrow, than the ratchet and pawl and lever mechanism heretofore used for the same purpose.

In order to prevent the wheels or drums of indicators 90 and 105 from overthrowing when said indicators are returned to zero I provide suitable locking means for temporarily locking said wheels when they reach the zero position. This is effected by providing the surface of each of said wheels with a slot 132 (Fig. 8) arranged to receive the laterally projecting end of locking fingers 133 (Fig. 9) secured on a horizontal sliding bar 134. The end of this bar is provided with a grooved collar 135 which is engaged by the end of a lever 136 (Figs. 2 and 5) fulcrumed at 137 on a bracket secured to the end of the registering housing or frame 45 and acted on by a spring 138 which normally holds the fingers 133 out of locking engagement with the indicator wheels. The free end of lever 136 is provided with a projection 139 normally bearing against the side face of wheel 119. This wheel is provided with a concentric slot 140 arranged to permit the projection 139 to enter the same during a portion of the rotation of wheel 119. As long as the projection 139 bears against the solid portion of the wheel 119 the locking fingers 133 are yieldingly held against the side faces of the indicator wheels or drums, so that as soon as the slot 132 in each of said drums comes opposite its locking finger the latter snaps into the slot, after which the wheel or drum can rotate only until the end of the slot abuts against the finger. This occurs when the slot or drum stands at zero. The slot 140 in wheel 119 is so arranged that the projection 139 on lever 136 bears against the solid portion of the wheel until after the indicator wheels or drums are all brought to zero position, in which position they are temporarily locked by the fingers 133. The continued rotation of wheel 119 then brings the slot 140 underneath the end of lever 136. When this occurs the spring 138 moves the lever 136 and withdraws the fingers 133 from the indicator wheels, thus unlocking the same. The other end of slot 140 and also the projection 139 are slightly beveled so that when wheel 119 is rotated further the end of the lever is forced out of the slot so as to bear against the solid portion of the wheel. During the most of the time that the end of lever 136 projects into slot 140 the blank portion of wheel 119 is presented to the intermeshing gear 120. The arrangement is such that the indicator wheels are locked only momentarily in zero position, which is sufficient to prevent their overthrowing, and are again unlocked so as to be free to be actuated.

The five registers, to-wit, the total mileage register 67, the pay-mileage register 69, the initial fare or trip register 122, the regular tariff register 128 and the extra tariff register 130 are all mounted on a single shaft and in alinement, this tending to simplification of the mechanism. The back plate 2 is provided with a window 142 through which all of said registers can be read.

The front wall of the casing is provided with two windows 143 and 144. Secured to the vertical sliding bar 75 is a plate or shutter 145 (Fig. 4) having on it in two lines in different vertical planes the words "Not" and "Hired" and between such words the word "Hired". When the flag is up the bar 75 is down thus bringing this plate in position to expose the words "Not" and "Hired" through the windows 143 and 144 respectively. When the flag is pulled down and the bar 75 raised it carries the shutter or plate 145 up with it and exposes the word "Hired" through the upper window 143 while the lower window now exposes the indicators 90 and 105 so that the passenger can easily see the amount of tariff which is registered. The passenger must pay the sum indicated on both indicators 90 and 105, but nothing more.

The entire apparatus is completely sealed and the driving connection from the vehicle is also sealed. Consequently the driver cannot tamper with the interior thereof and his operations are limited to the rotation of knob 40 to unlock the flag, set the indicators at zero and actuate the trip or initial fare register, to pull the flag down when unlocked, to push the flag still farther down one or more times to register any extra tariff or fare, and to again raise the flag. He can perform no other manipulations with the meter without detection. Whenever he starts to pull the flag down he must complete its downward movement and similarly when he starts to put it up this movement must be completed on account of the toothed segment 14 and arm 16 coöperating therewith. When the flag is in raised position the slide bar 75 is shoved down, clutch 70 is disengaged by the sliding bar 75 acting on clutch lever 72, and lever 97 is pushed down so far as to disengage its arm 101 from cam disk 102, and the clock is stopped by the engagement of the spring brake 88 with its balance wheel. Therefore, in this position, the only part of the meter which is actuated is the total mileage register 67, which, is of course, constantly in gear. When the flag is pulled down the slide bar 75 is elevated, permitting the clutch 70 to be thrown in to connect the pay-mileage register 69 with the driving shaft 57, the brake 88 is removed from the balance wheel of the clock, and the lever 97 is permitted to rise to bring its arm 101 into operative engagement with cam disk 102. In this position therefore, the total mileage register as well as the pay-mileage register are both actuated from the vehicle wheel. The indicator 90 and register 128 are intermittently actuated by the rotation of cam disk 102, which latter is driven either from the vehicle wheel, when the vehicle is running, or from the clock when the vehicle is standing still. The actuation of indicator 90 and register 128 continues uninterrupted as long as the flag is down and irrespective of whether the vehicle is running or standing still. The mileage registers 67 and 69, however, are actuated only when the vehicle is running. The extra tariff or fare indicator 105 and register 130 are actuated only when the driver pushes the flag still farther down, so causing the stud 111 on the flag spindle disk 13 to actuate the bell crank lever 108 as heretofore described.

When the flag is up the vehicle may run or stand still as desired. If running the mileage is counted on register 67. As soon as a passenger engages the vehicle the driver rotates knob 40 to unlock the flag to turn the indicators to zero and operate the trip or initial fare register 122. He immediately pulls the flag down, and this at once starts the clock and puts all other parts of the register in operative position so that thereafter the indicators and registers are actuated either from the clock or from the vehicle as stated. As soon as the trip is finished the driver will indicate the extra fare or tariff by manipulating the flag, and will then immediately raise the flag. The indicators are not affected by raising the flag so that the passenger has opportunity to leisurely view the amount of tariff which is registered and which he must pay. The register remains in this condition until another passenger engages the vehicle, when the knob 40 is again turned to unlock the flag, and the latter pulled down.

The mechanism described is the most simple device of this character heretofore gotten out. The number of levers and ratchet and pawl mechanism are reduced to a minimum and the movements secured as far as possible by positive rotary elements. The regular tariff and extra tariff registers are driven from their indicators by gear trains and thereby overthrowing or missing in actuation of these registers is largely prevented. The number of parts which the driver must manipulate are reduced to a minimum, comprising merely the flag and unlocking knob 40. Heretofore the extra fare indicator and register have been operated from a special knob, while with this device they are operated from the flag 1 which on account of the long leverage afforded makes its operation easy. Tampering with the register by either the driver or unauthorized parties is almost impossible without detection. The indicators and registers are all mounted in a single frame or housing which is self-contained and can be easily taken off for inspection or repair. The clock is similarly mounted in self-contained frame. Consequently in repairing the mechanism the housings or frames can be bodily removed without disturbing any of the mechanisms therein, which is of vast importance when trying to get at concealed parts of the mechanism, as heretofore to get at such parts has required taking apart practically the bulk of the very complicated mechanism.

Instead of using a flag any suitable attention attracting device may be substituted. In the claims the word "flag" is intended to include any suitable signal even though not in the form of a flag.

What I claim is:

1. In fare indicating and registering mechanism, the combination of an indicator, mechanism for intermittently actuating the same, a flag or signal arranged when moved to render said mechanism operative and inoperative, a lock for said flag or signal, lock actuating means, and connections whereby the actuation of said lock to unlock said flag or signal returns the indicator to zero.

2. In fare indicating and registering mechanism, the combination of an indicator, mechanism for intermittently actuating the same, a flag or signal arranged when moved to render said mechanism operative and inoperative, a rotary lock for said flag or signal, lock actuating means, and a train of rotary connections whereby the unlocking of said signal or flag returns the indicator to zero.

3. In fare indicating and registering mechanism, the combination of a register, a flag or signal arranged when moved to render said register operative and inoperative, a lock for said flag or signal, lock actuating means independent of the flag or signal, and connections whereby the actuation of the lock to release the signal operates the register.

4. In fare registering and indicating mechanism, the combination of a rotary register, a flag or signal arranged when moved to render said register operative and inoperative, a lock therefor, lock actuating means, and a train of rotary connections whereby the actuation of the lock to release the signal operates the register.

5. In fare indicating and registering mechanism, the combination of a register, an indicator, mechanism for intermittently actuating the indicator, a flag or signal arranged when moved to render said mechanism operative and inoperative, a lock therefor, lock actuating means, and connections whereby when the lock is actuated to release the signal the indicator is returned to zero and the register is operated.

6. In fare indicating and registering mechanism, the combination of a register, an indicator, mechanism for intermittently actuating the indicator, a flag or signal arranged when moved to render said mechanism operative and inoperative, a lock therefor, lock actuating means, and rotary connections whereby when the signal is unlocked the indicator is turned back to zero and the register is operated.

7. In fare registering and indicating mechanism, the combination of a shaft, indicating wheels or drums thereon, a rotary register, gearing connecting said shaft and register, a flag or signal arranged when moved to render the register actuating means operative and inoperative, a lock therefor, and connections whereby when the signal is unlocked said shaft is rotated to return the indicator wheels to zero and operate the register.

8. In fare registering and indicating mechanism, the combination of rotary indicating wheels or drums, mechanism for intermittently actuating the same, a flag or signal, a lock therefor, and mechanism actuated when said lock is actuated to release said flag for turning said wheels to zero, and means for temporarily locking said wheels at zero, said means being automatically controlled from mechanism which returns the wheels to zero.

9. In fare indicating and registering mechanism, the combination of indicating wheels or drums, mechanism for intermittently actuating the same, a rotary shaft arranged to return said wheels to zero, a flag or signal, a lock therefor, mechanism actuated when the lock is actuated to release said flag for rotating said shaft, and locks for said wheels controlled by a cam member on said shaft.

10. In fare indicating and registering mechanism, the combination of indicator wheels or drums, a rotary shaft, connections therefrom arranged to return said wheels to zero, a cam member on said shaft, a sliding rod actuated by said cam member, and locking members on said sliding rod arranged to temporarily engage the wheels or drums and lock the same in zero position.

11. In fare registering or indicating mechanism, the combination of a flag or signal, a rotary spindle therefor, a projection on said spindle, a locking member in the path of said projection, and a rotary disk provided with a notch for receiving a part of said locking member and permitting its withdrawal from the path of the projection on the spindle.

12. In fare registering and indicating mechanism, the combination of a flag or signal, a rotary spindle therefor, a projection on said spindle, a locking member lying in the path of said projection, a rotary disk provided with a notch to receive a part of said locking member and permit its withdrawal from the path of the projection on the flag spindle, and a yielding plate arranged to cover said notch.

13. In fare registering and indicating mechanism, the combination of a flag or signal, a rotary spindle therefor, a projection on said spindle, a locking lever, a member mounted thereon and arranged to yield in one direction and lying in the path of the projection on the signal spindle, and a rotary disk provided with a notch to receive a part of said lever and withdraw the same from the path of the projection on the spindle.

14. In fare registering and indicating mechanism, the combination of a flag or signal, a rotary spindle therefor, a projection on said spindle, a locking lever, a yielding member mounted on said lever and arranged to yield in one direction but not in the other and be engaged by the projection on the signal spindle, a locking disk provided with a notch to receive a projection on the lever and permit its withdrawal from the path of movement of the projection on the spindle, and a yielding plate arranged to cover said notch.

15. In fare registering and indicating mechanism, the combination of an indicator for displaying extra fares, a flag or signal having a "for hire" and "hired" position, connections whereby the movement of the flag when in one of said positions operates said indicator, and a lock automatically acting to prevent the return of the flag from "hired" position to "for hire" position.

16. In fare registering and indicating mechanism, the combination of an indicator for displaying extra tariffs, a flag or signal having a "for hire" position in which the registering mechanism is rendered inoperative, and a "hired" position in which the registering mechanism is operative, connections whereby the movement of the flag when in "hired" position operates the extra tariff indicator, and a lock automatically acting to prevent the return of the flag from "hired" position to "for hire" position.

17. In fare registering and indicating mechanism, the combination of a flag or signal, a lock therefor, two indicators, connections whereby when the signal is locked both indicators are inoperative, means for intermittently operating one of said indicators when the signal is unlocked, and connections from the signal arranged when the signal is unlocked to operate the other indicator.

18. In fare registering and indicating mechanism, the combination of a flag or signal having two positions, a mileage register, a tariff register, connections for operating both of said registers, and connections actuated from said flag whereby when the flag is in one position the operative connection to the tariff register is broken and when the flag is in the other position the operative connections to both registers are unbroken.

19. In fare registering and indicating mechanism, the combination of a flag or signal having two positions, a slide actuated by said flag or signal, a mileage register, a tariff register, a coöperating connection common to both of said registers, and connections from said slide whereby when the slide is in one position the operative connection to the tariff register is broken and that to the mileage register is intact, and when the slide is in the other position the operative connection to both registers is intact.

20. In fare registering and indicating mechanism, the combination of a pivotally mounted permanently connected flag or signal, a movable slide, connections from the signal to said slide, registering mechanism, a clock arranged to operate said registering mechanism, mechanism adapted to be driven from the vehicle wheel and also arranged to operate said registering mechanism, and connections whereby when the flag is in one position the clock is rendered inoperative and the slide is actuated and acts to break the operative connection between the register and the wheel driven mechanism.

21. In fare registering and indicating mechanism, the combination of a plate, a housing removably secured thereto, a shaft mounted in said housing, a total mileage register, a pay mileage register, a trip register, a regular tariff register, and an extra tariff register, each comprising registering wheels rotatably mounted on said shaft, and an independent connection for operating each of said registers.

22. In fare indicating and registering mechanism, the combination of a plate, a housing removably secured thereto and containing registering and indicating mechanism, another housing secured thereto and including clock mechanism, connections between the clock and registering mechanism, and mechanism mounted on said plate and arranged to control said registering and clock mechanisms.

23. In fare registering and indicating mechanism, the combination of registers and indicators, actuating means therefor, a flag or signal having two positions, connections whereby the movement of the flag to one of said positions renders the registers and indicators inoperative, and the movement of said flag to the other position renders said registers and indicators inoperative, and a lock for locking said flag or signal in the latter position.

24. In fare registering and indicating mechanism, the combination of registers and indicators, a flag or signal having two positions in one of which the registers and indicators are inoperative and in the other of which they are operative, a vertically movable slide actuated from said flag or signal and arranged to render the registers operative and inoperative, and an indicator secured to said slide.

25. In fare registering and indicating mechanism, the combination of a flag or signal having two positions, registering mechanism, connections for intermittently operating said mechanism, a vertical slide controlled by said flag or signal, connection from said slide whereby when the flag or signal is in one position the operating connection to the register is broken, and the indicator carried by said slide.

In testimony whereof, I have hereunto set my hand.

PAUL RICHERT.

Witnesses:
RUDOLPH ROCHOW,
RICHARD HOPF.